(12) United States Patent
Zhong

(10) Patent No.: US 12,005,950 B2
(45) Date of Patent: Jun. 11, 2024

(54) TRANSPORTATION DEVICE

(71) Applicant: WONDERLAND SWITZERLAND AG, Steinhausen (CH)

(72) Inventor: Zhiren Zhong, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 9 days.

(21) Appl. No.: 17/994,843

(22) Filed: Nov. 28, 2022

(65) Prior Publication Data

US 2023/0166785 A1    Jun. 1, 2023

(30) Foreign Application Priority Data

Nov. 29, 2021    (CN) .......................... 202111435742.3

(51) Int. Cl.
*B62B 9/12*      (2006.01)
*B62B 7/04*      (2006.01)
*B62B 9/10*      (2006.01)

(52) U.S. Cl.
CPC ................ *B62B 9/102* (2013.01); *B62B 7/04* (2013.01); *B62B 9/12* (2013.01)

(58) Field of Classification Search
CPC .......... B62B 9/102; B62B 9/104; B62B 9/20; B62B 9/12; B62B 7/04; B62B 7/06; B62B 7/14
See application file for complete search history.

(56) References Cited

U.S. PATENT DOCUMENTS

| | | | |
|---|---|---|---|
| 9,545,940 B2* | 1/2017 | Taylor | B62B 7/142 |
| 11,203,371 B2* | 12/2021 | Zhong | B62B 7/068 |
| 11,851,099 B2* | 12/2023 | Nieuwenhuizen | B62B 9/12 |
| 2013/0113185 A1* | 5/2013 | Zehfuss | B62B 3/02 |
| | | | 280/647 |

FOREIGN PATENT DOCUMENTS

TW      202128478 A      8/2021

* cited by examiner

*Primary Examiner* — John D Walters
(74) *Attorney, Agent, or Firm* — CANTOR COLBURN LLP

(57) ABSTRACT

A transportation device includes a frame and a carrier. The frame includes a rail, a fixing base, an unlock member and a sliding member. The rail has a first engaging hole with a first retaining wall. The unlock member has an engaging portion. An end of the sliding member abuts against the unlock member. The carrier includes a connecting base with a rib. The connecting base is connected to the fixing base to install the carrier on the frame. When the carrier faces a first direction, the rib pushes the sliding member to push the unlock member, such that a length of the engaging portion protruding from the fixing base is reduced. When the carrier faces a second direction, the rib is staggered with the sliding member.

10 Claims, 13 Drawing Sheets

TRANSPORTATION DEVICE

CROSS REFERENCE TO RELATED APPLICATIONS

This application claims priority to Chinese Patent Application No. 202111435742.3, filed Nov. 29, 2021, and all the benefits accruing therefrom under 35 U.S.C. § 119, the contents of which in its entirety are herein incorporated by reference.

BACKGROUND OF THE INVENTION

Field of the Invention

The invention relates to a transportation device and, more particularly, to a transportation device capable of restraining an adjustable height as a carrier faces different directions.

Description of the Prior Art

A stroller is a tool used by parents to carry babies or children when they go shopping. At present, a seat of some strollers has a height adjusting mechanism for a user to adjust a height of the seat according to different babies or children, so as to make the seated babies or children more comfortable. Furthermore, the seat of some strollers may be selectively installed toward a forward direction or a rearward direction of a frame. When the seat faces the rearward direction of the frame, the user will want to raise the seat a little to get closer to the child. On the other hand, when the seat faces the forward direction of the frame, there will be a risk of overturning if the seat is too high. Thus, if the seat faces the forward direction of the frame and is adjusted too high, the stroller will be difficult to pass the stability test.

SUMMARY OF THE INVENTION

The invention provides a transportation device capable of restraining an adjustable height as a carrier faces different directions.

According to an embodiment of the invention, a transportation device includes a frame and a carrier. The frame comprises a rail, a fixing base, an unlock member and a sliding member. The fixing base is slidably connected to the rail. The rail has at least one first engaging hole. The at least one first engaging hole has a first retaining wall. The unlock member is movably disposed in the fixing base. The unlock member has an engaging portion. The engaging portion protrudes from the fixing base. The sliding member is slidably disposed in the fixing base. An end of the sliding member abuts against the unlock member. The carrier comprises a connecting base. The connecting base has a rib. The connecting base is connected to the fixing base to install the carrier on the frame. When the carrier faces a first direction, the rib pushes the sliding member to push the unlock member, such that a length of the engaging portion protruding from the fixing base is reduced, and the engaging portion is unable to be retained by the first retaining wall. When the carrier faces a second direction different from the first direction, the rib is staggered with the sliding member, such that the engaging portion is able to be retained by the first retaining wall.

Preferably, the rail further has at least one second engaging hole, the at least one second engaging hole has a second retaining wall, and a height of the second retaining wall is larger than a height of the first retaining wall. When the carrier faces the first direction or the second direction, the engaging portion is able to be retained by the second retaining wall.

Preferably, the rail further has at least one inclined surface and the at least one inclined surface extends from the first retaining wall such that the height of the first retaining wall is reduced.

Preferably, the transportation device is configured to be placed on a plane, and a distance between the at least one first engaging hole and the plane is larger than a distance between the at least one second engaging hole and the plane.

Preferably, the first direction is a forward direction of the frame and the second direction is a rearward direction of the frame.

Preferably, the sliding member and the unlock member have two inclined surfaces abutting against each other.

Preferably, the frame further comprises a first elastic member and the first elastic member abuts against the unlock member and the fixing base.

Preferably, the frame further comprises a second elastic member and the second elastic member abuts against the sliding member and the fixing base.

Preferably, the sliding member has a slot, the fixing base has a protruding portion, the protruding portion is located in the slot, the second elastic member is disposed in the slot, and the second elastic member abuts against a side wall of the slot and the protruding portion.

Preferably, the connecting base has a recess, the connecting base is sleeved on the fixing base through the recess, and the rib is located in the recess.

According to an embodiment of the invention, a transportation device includes a frame and a carrier. The frame comprises a handle, a rail, a fixing base, an unlock member and a sliding member. The rail is connected to the handle. The fixing base is slidably connected to the rail. The rail has at least one first engaging hole. The at least one first engaging hole has a first retaining wall. The unlock member is movably disposed in the fixing base. The unlock member has an engaging portion. The engaging portion protrudes from the fixing base. The sliding member is slidably disposed in the fixing base. An end of the sliding member abuts against the unlock member and another end of the sliding member protrudes from the fixing base. The carrier comprises a connecting base. The connecting base has a rib. The connecting base is connected to the fixing base to install the carrier on the frame. When the carrier faces a first direction, the rib pushes the sliding member to slide to push the unlock member to move, so as to reduce a length of the engaging portion protruding from the fixing base, such that the engaging portion is unable to be retained by the first retaining wall and unable to engage with the at least one first engaging hole. When the carrier faces a second direction different from the first direction, the rib is staggered with the sliding member, such that the engaging portion is able to be retained by the first retaining wall and able to engage with the at least one first engaging hole.

Preferably, the rail further has at least one second engaging hole, the at least one second engaging hole has a second retaining wall, and a height of the second retaining wall is larger than a height of the first retaining wall. When the carrier faces the first direction or the second direction, the engaging portion is able to be retained by the second retaining wall and able to engage with the at least one second engaging hole.

Preferably, the rail further has at least one inclined surface and the at least one inclined surface extends from the first retaining wall to reduce the height of the first retaining wall.

As mentioned in the above, when the carrier faces the first direction, the engaging portion of the unlock member is unable to engage with the first engaging hole of the rail, such that a user cannot adjust the carrier to a height corresponding to the first engaging hole. On the other hand, when the carrier faces the second direction, the engaging portion of the unlock member is able to engage with the first engaging hole of the rail, such that the user can adjust the carrier to the height corresponding to the first engaging hole. Accordingly, when the carrier faces different directions, the invention can restrain an adjustable height of the carrier correspondingly. In some embodiments, the first direction may be the forward direction of the frame and the second direction may be the rearward direction of the frame. At this time, the carrier facing the forward direction cannot be adjusted too high, so as to avoid the risk of overturning. Still further, the carrier facing the rearward direction can be adjusted a little higher, so as to make the user closer to a baby or an object in the carrier. Therefore, the transportation device of the invention can satisfy different requirements in use and can also ensure safety.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
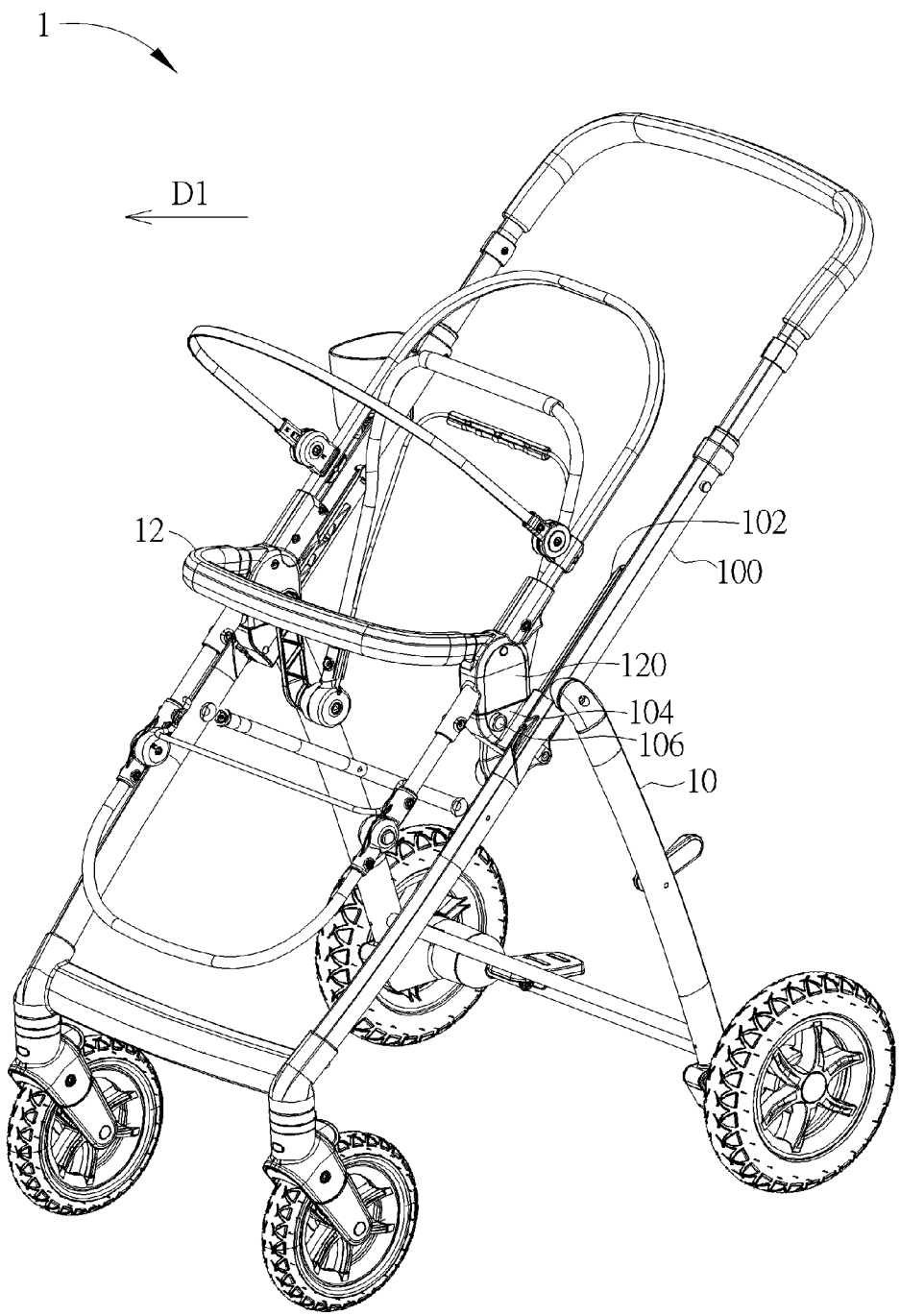
FIG. 1 is a perspective view illustrating a transportation device according to an embodiment of the invention.
Figure 2:
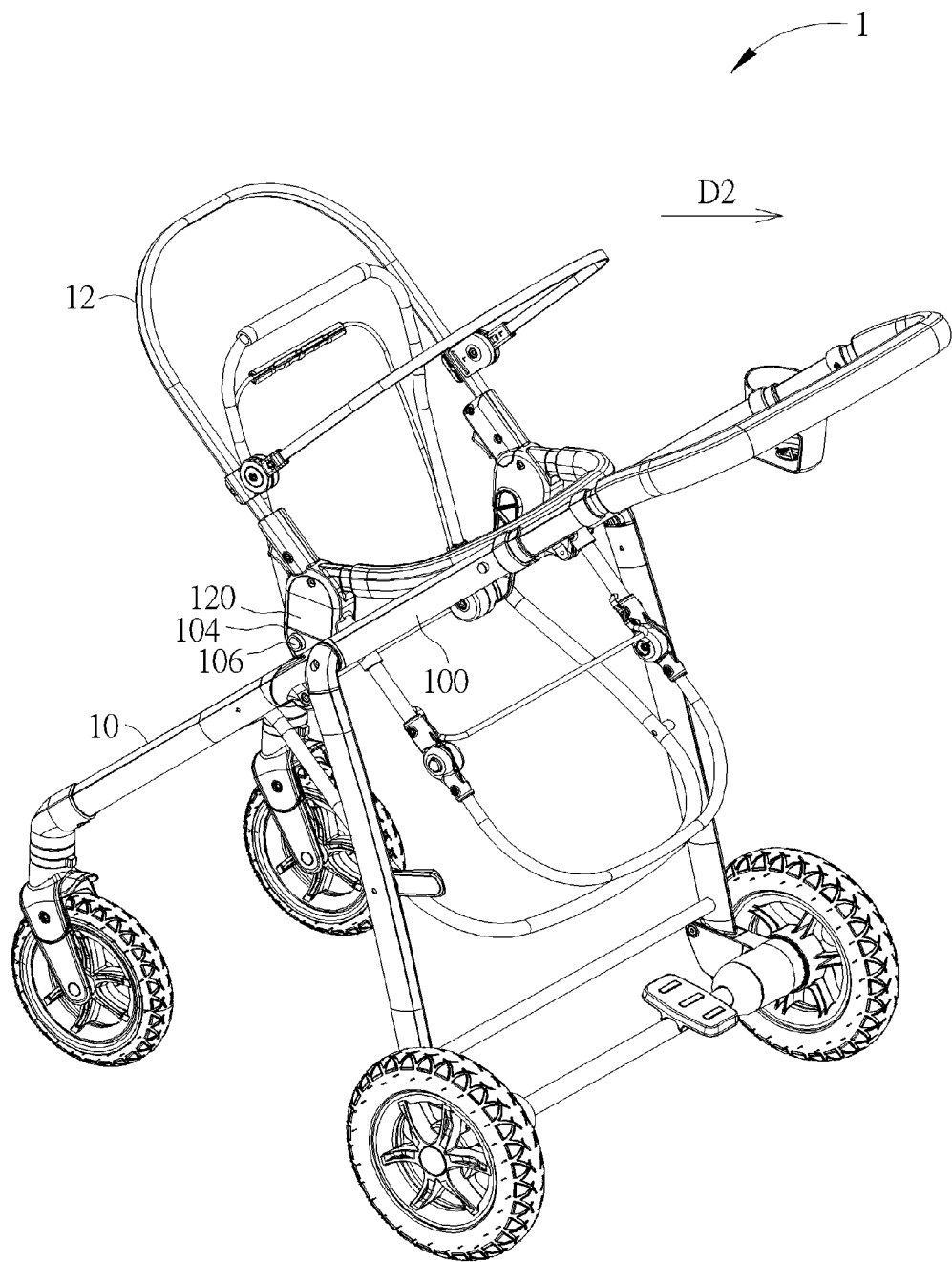
FIG. 2 is a perspective view illustrating a carrier shown in FIG. 1 facing a second direction.
Figure 3:
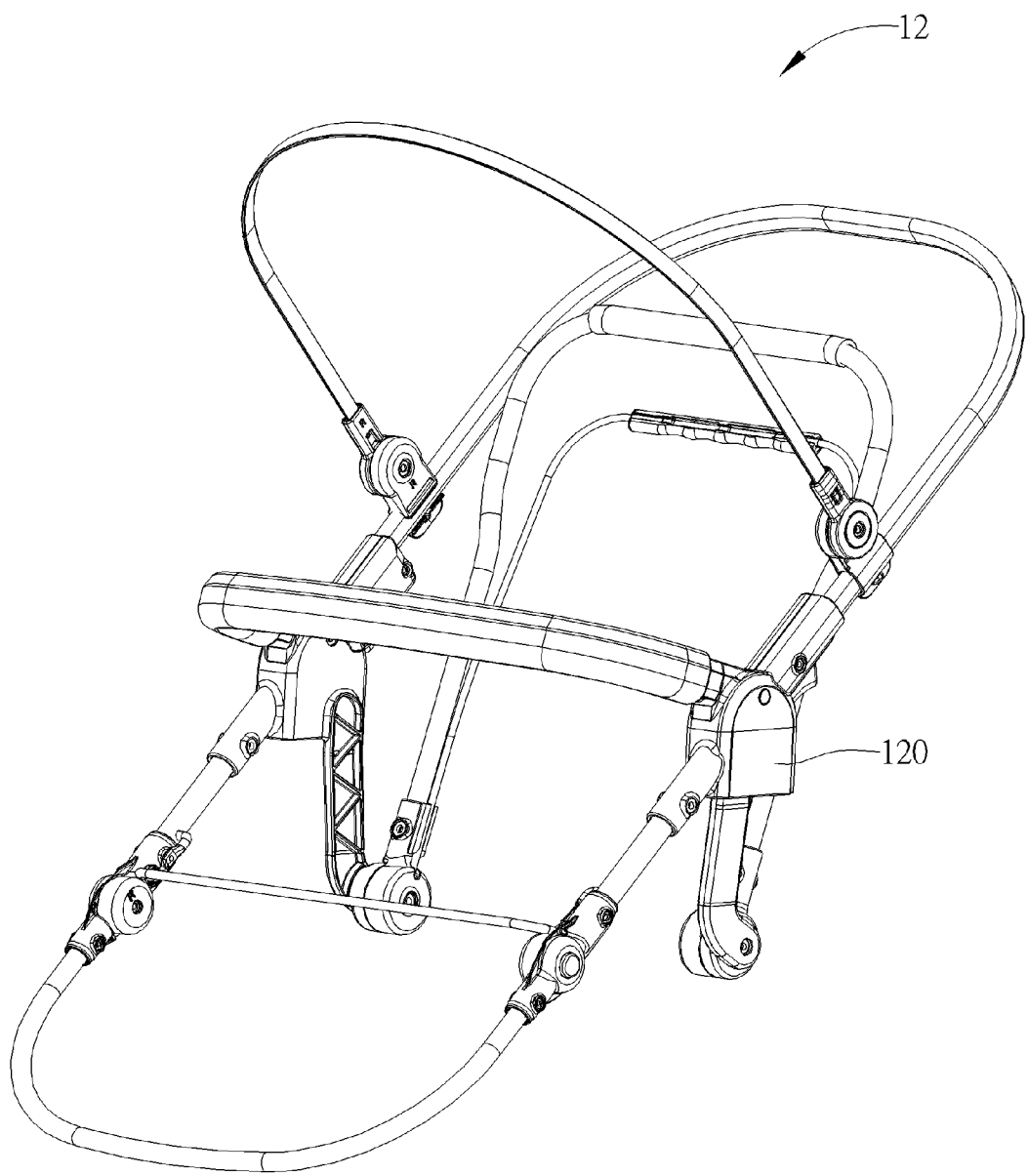
FIG. 3 is a perspective view illustrating the carrier shown in FIG. 1.
Figure 4:
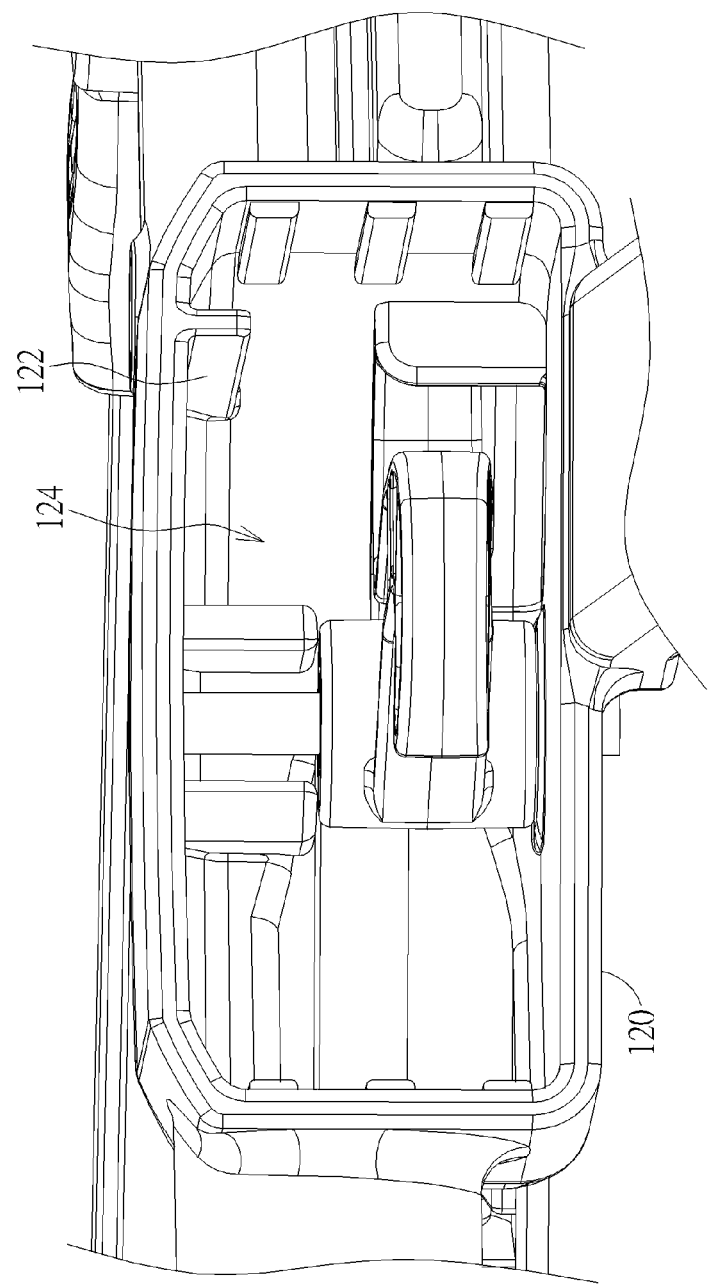
FIG. 4 is a perspective view illustrating a connecting base shown in FIG. 3 from another viewing angle.
Figure 5:
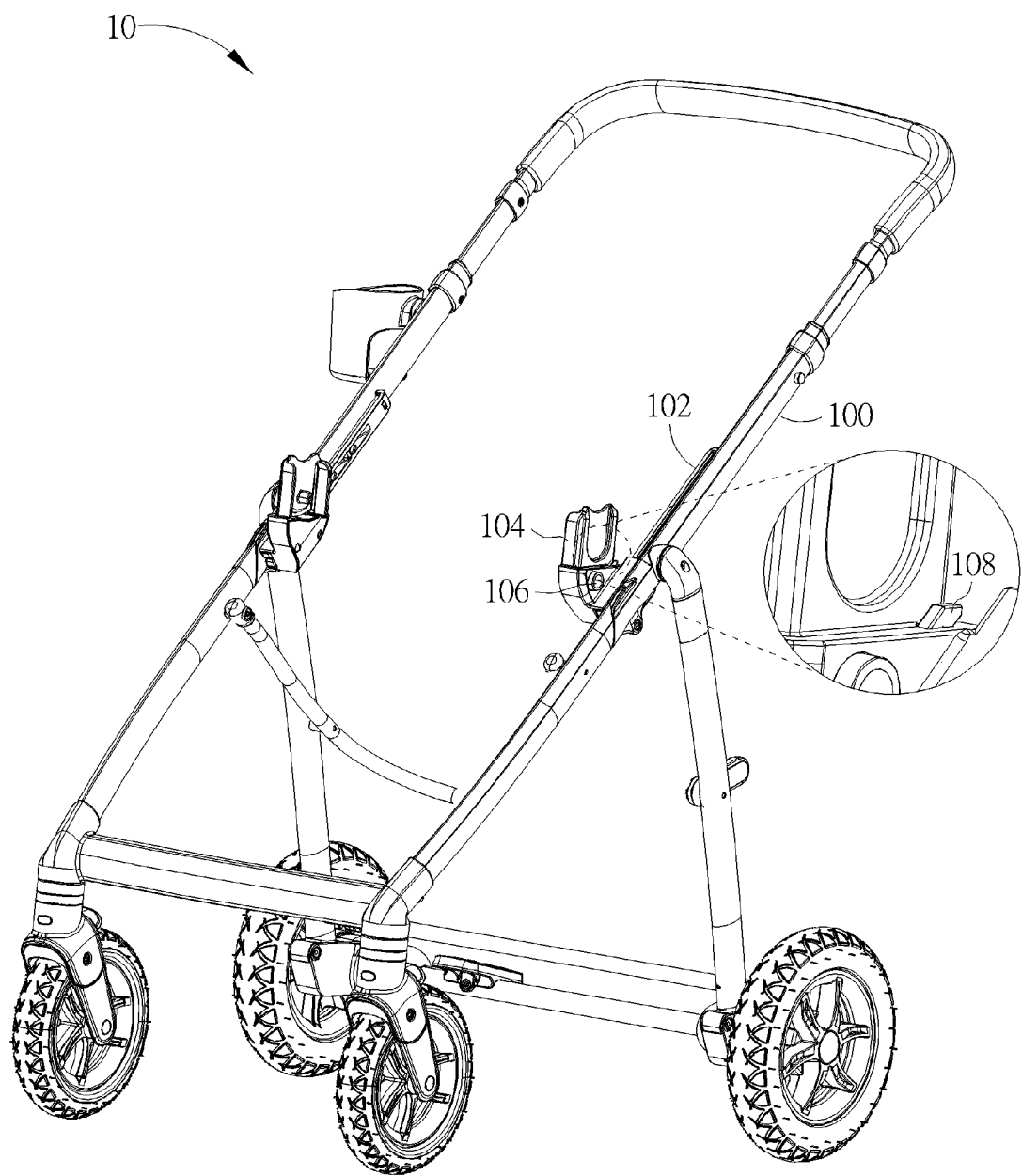
FIG. 5 is a perspective view illustrating a frame shown in FIG. 1.
Figure 6:
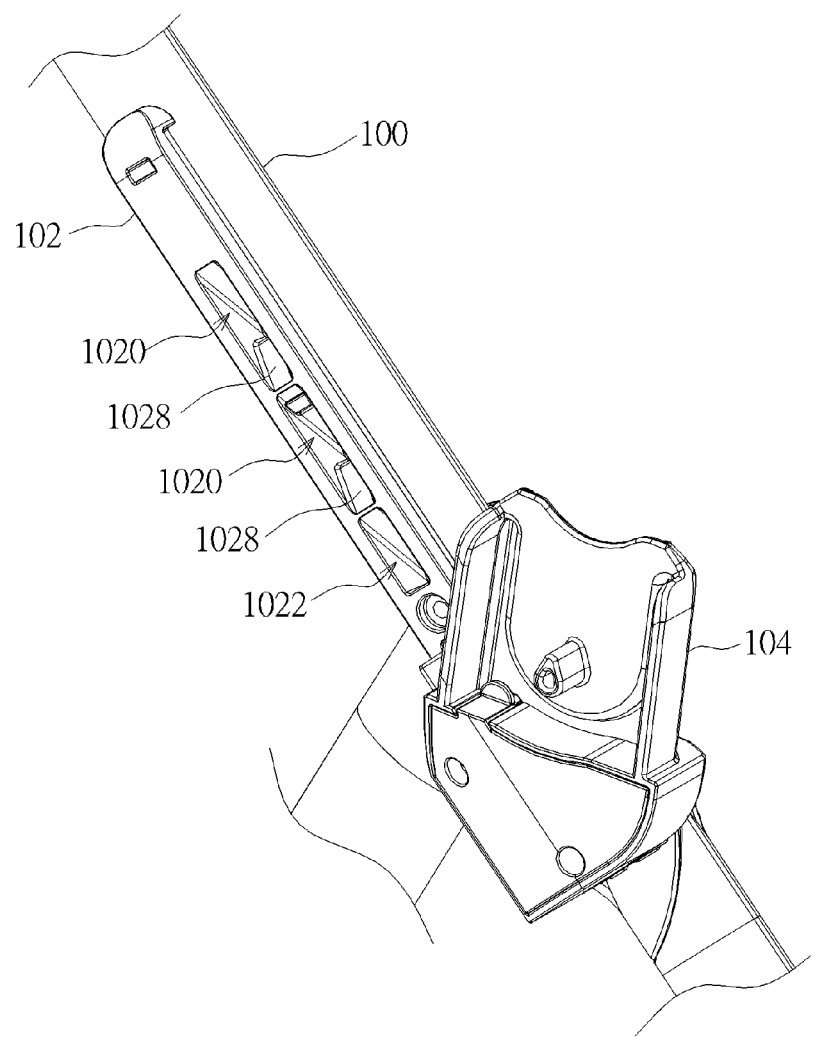
FIG. 6 is a perspective view illustrating a fixing base and a rail shown in FIG. 5 from another viewing angle.
Figure 7:
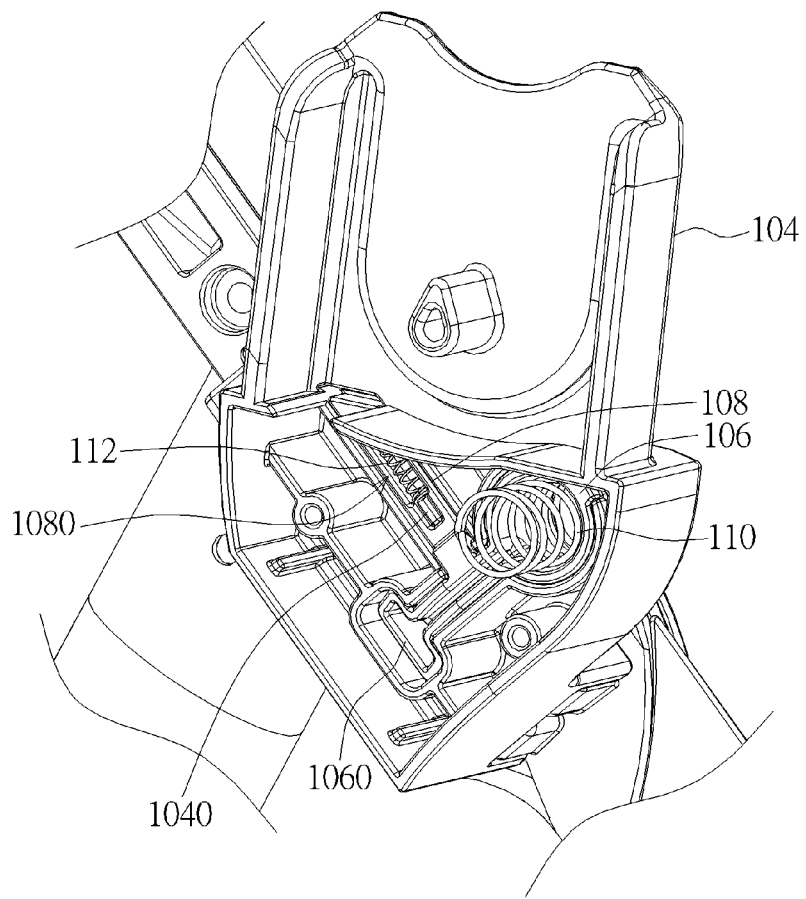
FIG. 7 is an inside perspective view illustrating the fixing base shown in FIG. 6.
Figure 8:
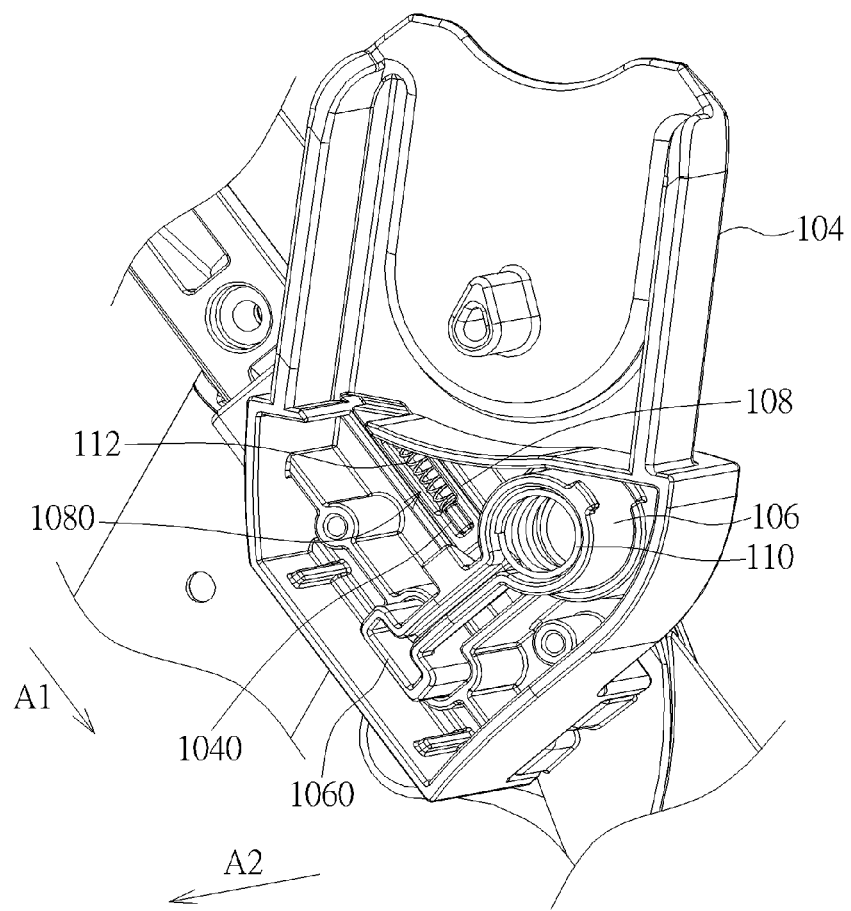
FIG. 8 is a perspective view illustrating a sliding member shown in FIG. 7 being pushed.
Figure 9:
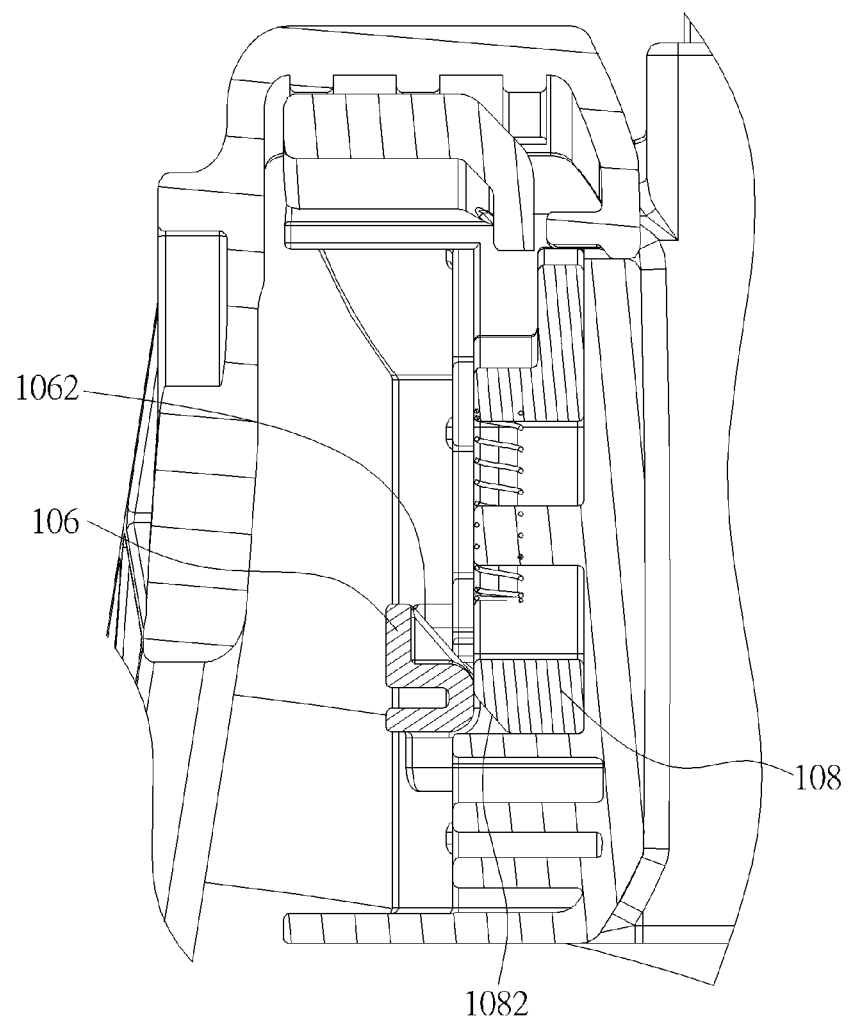
FIG. 9 is a cross-sectional view illustrating the sliding member shown in FIG. 8 pushing an unlock member.
Figure 10:
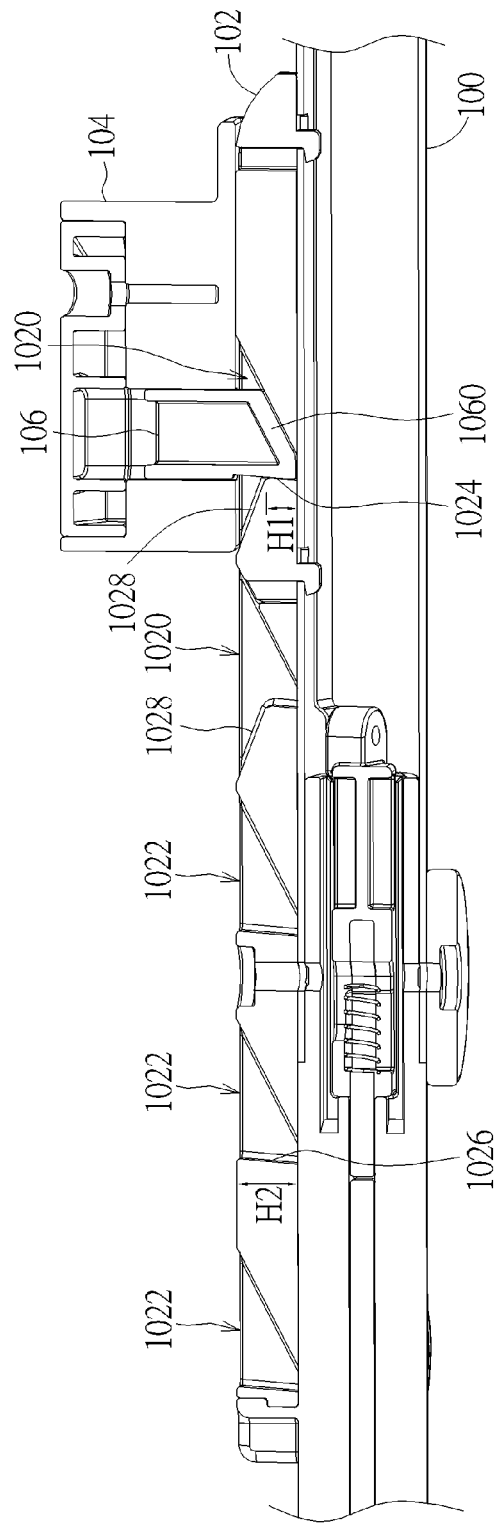
FIG. 10 is a cross-sectional view illustrating an engaging portion of the unlock member engaging with a first engaging hole of the rail.
Figure 11:
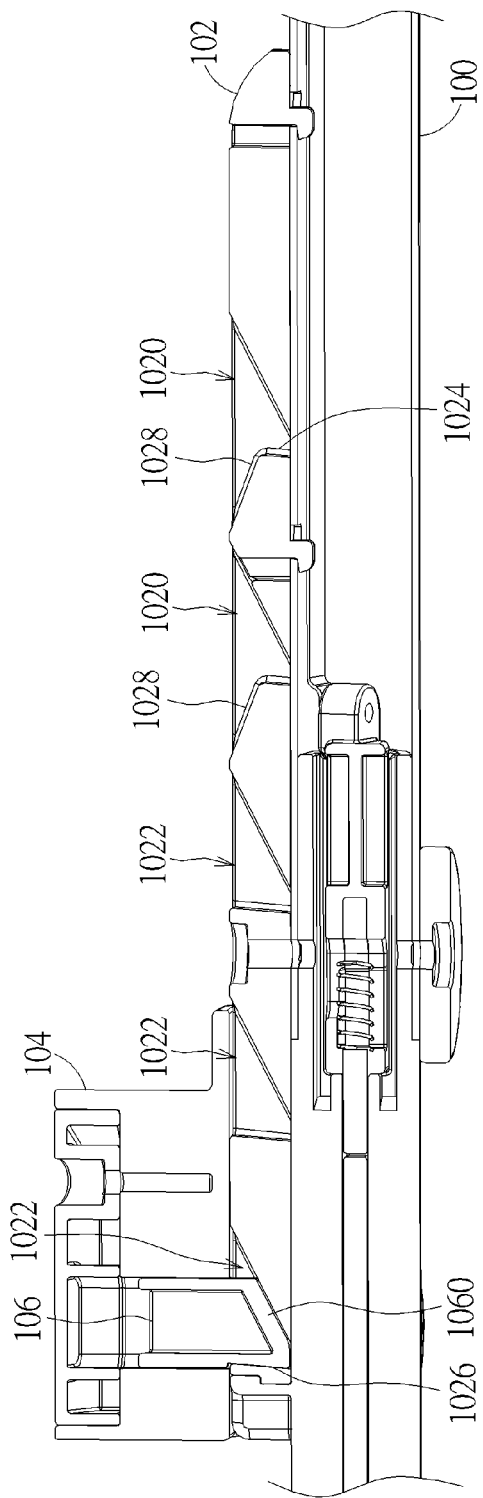
FIG. 11 is a cross-sectional view illustrating the engaging portion of the unlock member engaging with a second engaging hole of the rail.
Figure 12:
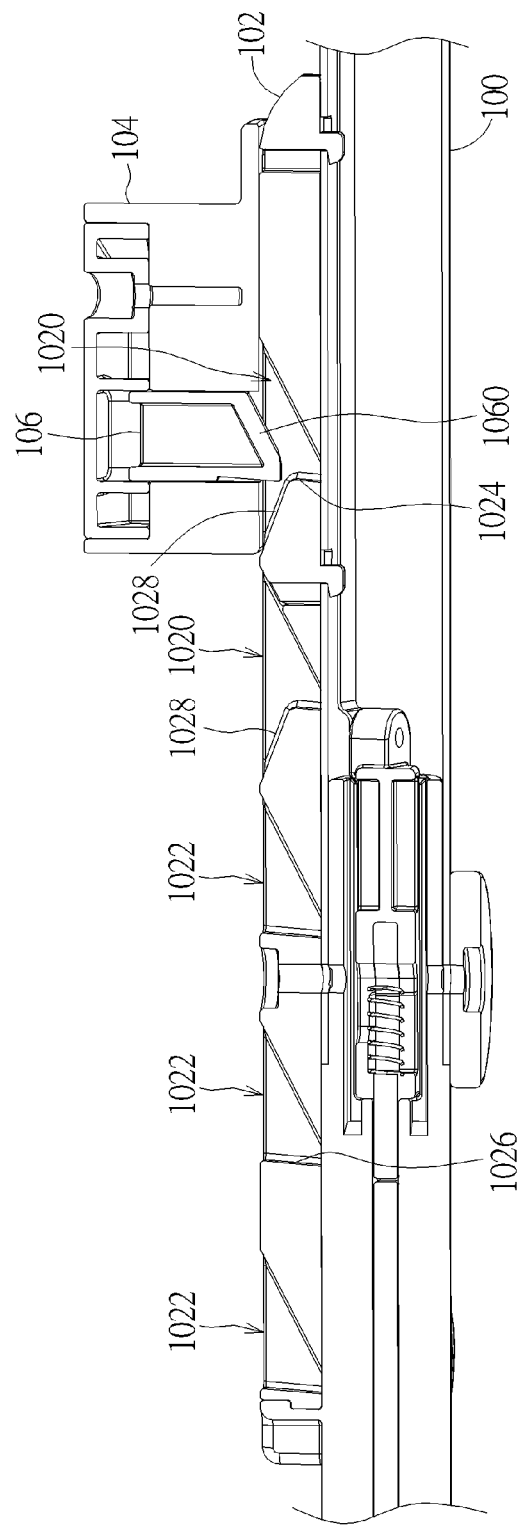
FIG. 12 is a cross-sectional view illustrating the engaging portion of the unlock member unable to engage with the first engaging hole of the rail.
Figure 13:
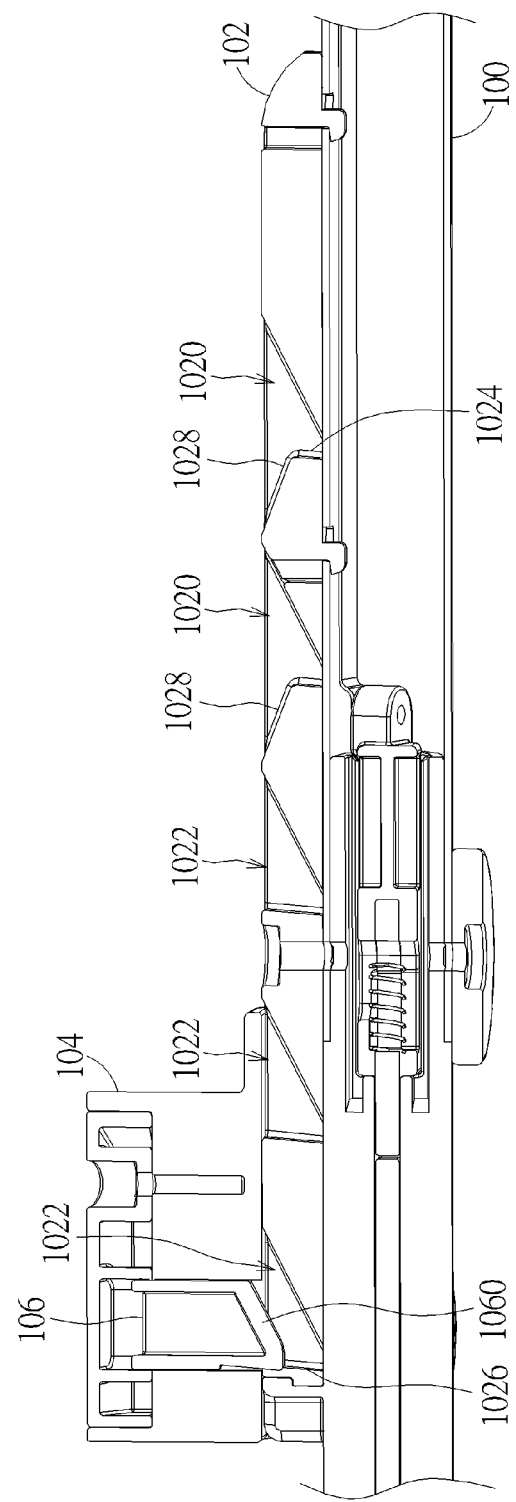
FIG. 13 is another cross-sectional view illustrating the engaging portion of the unlock member engaging with the second engaging hole of the rail.

Referring to FIGS. 1 to 13, FIG. 1 is a perspective view illustrating a transportation device 1 according to an embodiment of the invention, FIG. 2 is a perspective view illustrating a carrier 12 shown in FIG. 1 facing a second direction D2, FIG. 3 is a perspective view illustrating the carrier 12 shown in FIG. 1, FIG. 4 is a perspective view illustrating a connecting base 120 shown in FIG. 3 from another viewing angle, FIG. 5 is a perspective view illustrating a frame 10 shown in FIG. 1, FIG. 6 is a perspective view illustrating a fixing base 104 and a rail 102 shown in FIG. 5 from another viewing angle, FIG. 7 is an inside perspective view illustrating the fixing base 104 shown in FIG. 6, FIG. 8 is a perspective view illustrating a sliding member 108 shown in FIG. 7 being pushed, FIG. 9 is a cross-sectional view illustrating the sliding member 108 shown in FIG. 8 pushing an unlock member 106, FIG. 10 is a cross-sectional view illustrating an engaging portion 1060 of the unlock member 106 engaging with a first engaging hole 1020 of the rail 102, FIG. 11 is a cross-sectional view illustrating the engaging portion 1060 of the unlock member 106 engaging with a second engaging hole 1022 of the rail 102, FIG. 12 is a cross-sectional view illustrating the engaging portion 1060 of the unlock member 106 unable to engage with the first engaging hole 1020 of the rail 102, and FIG. 13 is another cross-sectional view illustrating the engaging portion 1060 of the unlock member 106 engaging with the second engaging hole 1022 of the rail 102.

As shown in FIGS. 1 and 2, a transportation device 1 of the invention comprises a frame 10 and a carrier 12. The carrier 12 may be selectively installed toward a first direction D1 shown in FIG. 1 and a second direction D2 shown in FIG. 2, so as to satisfy different requirements in use. In this embodiment, the first direction D1 may be a forward direction of the frame 10 and the second direction D2 may be a rearward direction of the frame 10, but the invention is not so limited. The transportation device 1 may be a stroller or other devices used for transportation. The carrier 12 may be a seat, a bassinet or other carriers for carrying a baby or an object. It should be noted that the structures of the frame 10 and the carrier 12 of the transportation device 1 of the invention are substantially symmetrical and the technical features of the invention will be described by the structures of one side in the following.

As shown in FIGS. 3 and 4, the carrier 12 comprises a connecting base 120 and the connecting base 120 has a rib 122. In this embodiment, a bottom of the connecting base 120 may have a recess 124 and the rib 122 is located in the recess 124. As a specific example, the carrier 12 is a seat, the carrier 12 may further comprise a backrest, a footrest, a canopy and/or an armbar according to practical applications. Needless to say, the carrier 12 may also be a bassinet or other carriers for carrying a baby or an object, wherein the corresponding structure is well known by one skilled in the art, so the explanation will not be depicted herein.

As shown in FIGS. 5 to 7, the frame 10 comprises a handle 100, a rail 102, a fixing base 104, an unlock member 106, a sliding member 108, a first elastic member 110 and a second elastic member 112. The rail 102 is connected to the handle 100. In this embodiment, the rail 102 may be fixed on an inner side of the handle 100. The fixing base 104 is slidably connected to the rail 102. The connecting base 120 of the carrier 12 (as shown in FIG. 3) is detachably connected to the fixing base 104 to install the carrier 12 on the frame 10. For further explanation, the connecting base 120 of the carrier 12 is sleeved on the fixing base 104 through the recess 124 (referring to FIG. 4), such that a height of the carrier 12 may be adjusted as the fixing base 104 slides upward and downward with respect to the rail 102.

As shown in FIGS. 7 to 13, the unlock member 106 is movably disposed in the fixing base 104. The unlock member 104 has an engaging portion 1060 and the engaging portion 1060 protrudes from the fixing base 104 toward the rail 102. The first elastic member 110 abuts against the unlock member 106 and the fixing base 104. The sliding member 108 is slidably disposed in the fixing base 104. An end of the sliding member 108 abuts against the unlock member 106 and another end of the sliding member 108 protrudes from the fixing base 104 (as shown in FIG. 5). In this embodiment, the sliding member 108 and the unlock member 106 have two inclined surfaces 1082, 1062 abutting against each other (as shown in FIG. 9). The second elastic member 112 abuts against the sliding member 108 and the fixing base 104. In this embodiment, the sliding member 108 may have a slot 1080 and the fixing base 104 may have a protruding portion 1040; the protruding portion 1040 is located in the slot 1080. The second elastic member 112 may be disposed in the slot 1080 of the sliding member 108, and the second elastic member 112 abuts against a side wall of the slot 1080 and the protruding portion 1040. In this embodiment, the first elastic member 110 and the second elastic member 112 may be, but are not limited to, springs.

As shown in FIGS. 10 to 13, the rail 102 has at least one first engaging hole 1020 and at least one second engaging hole 1022. In this embodiment, the rail 102 may have two first engaging holes 1020 and three second engaging holes 1022, but the invention is not so limited. The number of first engaging holes 1020 and second engaging holes 1022 may be determined according to practical applications. The first engaging holes 1020 and the second engaging holes 1022 are arranged at intervals along a length direction of the rail 102. When the transportation device 1 is placed on a plane (e.g. ground), a distance between the first engaging hole 1020 and the plane is larger than a distance between the second engaging hole 1022 and the plane. In other words, when the transportation device 1 is placed on a plane (e.g. ground), a height of the first engaging hole 1020 relative to the plane is larger than a height of the second engaging hole 1022 relative to the plane.

As shown in FIGS. 10 to 13, the first engaging hole 1020 has a first retaining wall 1024 and the second engaging hole 1022 has a second retaining wall 1026. A height H2 of the second retaining wall 1026 is larger than a height H1 of the first retaining wall 1024. In this embodiment, the rail 102 may further have at least one inclined surface 1028, and the inclined surface 1028 extends from the first retaining wall 1024, such that the height H1 of the first retaining wall 1024 is reduced, such that the height H2 of the second retaining wall 1026 is larger than the height H1 of the first retaining wall 1024.

In the following, the components shown in FIGS. 1 to 13 are used to depict the operation principle of the invention.

When the carrier 12 is installed on the frame 10 and faces the first direction D1 shown in FIG. 1, the rib 122 of the carrier 12 pushes the sliding member 108 to slide in a direction of an arrow A1 shown in FIG. 8. Then, the slide member 108 slides to a position under the inclined surface 1062 of the unlock member 106 through the inclined surface 1082 at the end to push the unlock member 106 to move in a direction of an arrow A2 shown in FIG. 8, so as to reduce a length of the engaging portion 1060 protruding from the fixing base 104, such that the engaging portion 1060 is unable to be retained by the first retaining wall 1024 and unable to engage with the first engaging hole 1020, as shown in FIGS. 8 and 12. In some embodiments, the direction of the arrow A1 may be substantially perpendicular to the direction of the arrow A2, but the invention is not so limited. Since the engaging portion 1060 of the unlock member 106 is unable to engage with the first engaging hole 1020 of the rail 102, a user cannot adjust the carrier 12 to a height corresponding to the first engaging hole 1020. Furthermore, in this embodiment, the height H2 of the second retaining wall 1026 is larger than the height H1 of the first retaining wall 1024. Thus, when the carrier 12 is installed on the frame 10 and faces the first direction D1 shown in FIG. 1, the engaging portion 1060 of the unlock member 106 is still able to be retained by the second retaining wall 1026 and able to engage with the second engaging hole 1022, as shown in FIG. 13. In this embodiment, the rail 102 has three second engaging holes 1022. Thus, when the carrier 12 is installed on the frame 10 and faces the first direction D1 shown in FIG. 1, the user may adjust the carrier 12 to the height corresponding to one of the three second engaging holes 1022, such that the height of the carrier 12 may be adjusted in three stages. When the user wants to adjust the height of the carrier 12, the user may press the unlock member 106 to disengage the engaging portion 1060 from the second engaging hole 1022. When the unlock member 106 is pressed, the unlock member 106 compresses the first elastic member 110. Then, the user may slide the carrier 12 with the fixing base 104 to the height corresponding to one of the three second engaging holes 1022. At this time, the first elastic member 110 will drive the unlock member 106 to return, such that the engaging portion 1060 engages with the second engaging hole 1022.

When the rib 122 of the carrier 12 pushes the sliding member 108, the sliding member 108 compresses the second elastic member 112. When the user detaches the carrier 12 from the frame 10, the second elastic member 112 will drive the sliding member 108 to return. At this time, the first elastic member 110 will also drive the unlock member 106 to return, such that the length of the engaging portion 1060 protruding from the fixing base 104 recovers to the length shown in FIGS. 10 and 11. Then, the user may orient the carrier 12 toward the second direction D2 different from the first direction D1 and install the carrier 12 on the frame 10, as shown in FIG. 2. When the carrier 12 is installed on the frame 10 and faces the second direction D2 shown in FIG. 2, the rib 122 of the carrier 12 is staggered with the sliding member 108 (i.e. the rib 122 of the carrier 12 is unable to push the sliding member 108), such that the length of the engaging portion 1060 of the unlock member 106 protruding from the fixing base 104 is kept as the length shown in FIGS. 10 and 11. At this time, the engaging portion 1060 of the unlock member 106 is able to be retained by the first retaining wall 1024 and able to engage with the first engaging hole 1020, as shown in FIG. 10. Needless to say, the engaging portion 1060 of the unlock member 106 is also able to be retained by the second retaining wall 1026 and able to engage with the second engaging hole 1022, as shown in FIG. 11. In this embodiment, the rail 102 has two first engaging holes 1020 and three second engaging holes 1022. Thus, when the carrier 12 is installed on the frame 10 and faces the second direction D2 shown in FIG. 2, the user may adjust the carrier 12 to the height corresponding to one of the two first engaging holes 1020 and the three second engaging holes 1022, such that the height of the carrier 12 may be adjusted in five stages. When the user wants to adjust the height of the carrier 12, the user may press the unlock member 106 to disengage the engaging portion 1060 from the first engaging hole 1020 or the second engaging hole 1022. When the unlock member 106 is pressed, the unlock member 106 compresses the first elastic member 110. Then, the user may slide the carrier 12 with the fixing base 104 to the height corresponding to one of the two first engaging holes 1020 and the three second engaging holes 1022. At this time, the first elastic member 110 will drive the unlock member 106 to return, such that the engaging portion 1060 engages with the first engaging hole 1020 or the second engaging hole 1022.

It should be noted that the invention may increase or decrease the adjustable stages for the height of the carrier 12 by increasing or decreasing the number of first engaging holes 1020 and second engaging holes 1022, so the invention is not limited to the embodiment shown in the figures.

As mentioned in the above, when the carrier faces the first direction, the engaging portion of the unlock member is unable to engage with the first engaging hole of the rail, such that a user cannot adjust the carrier to a height corresponding to the first engaging hole. On the other hand, when the carrier faces the second direction, the engaging portion of the unlock member is able to engage with the first engaging hole of the rail, such that the user can adjust the carrier to the height corresponding to the first engaging hole. Accordingly, when the carrier faces different directions, the invention can restrain an adjustable height of the carrier correspondingly. In some embodiments, the first direction may be the forward direction of the frame and the second direction may be the rearward direction of the frame. At this time, the carrier facing the forward direction cannot be adjusted too high, so as to avoid the risk of overturning. Still further, the carrier facing the rearward direction can be adjusted a little higher, so as to make the user closer to a baby or an object in the carrier. Therefore, the transportation device of the invention can satisfy different requirements in use and can also ensure safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transportation device comprising:
   a frame comprising a rail, a fixing base, an unlock member and a sliding member, the fixing base being slidably connected to the rail, the rail having at least one first engaging hole, the at least one first engaging hole having a first retaining wall, the unlock member being movably disposed in the fixing base, the unlock member having an engaging portion, the engaging portion protruding from the fixing base, the sliding member being slidably disposed in the fixing base, an end of the sliding member abutting against the unlock member; and
   a carrier comprising a connecting base, the connecting base having a rib, the connecting base being connected to the fixing base to install the carrier on the frame;
   wherein, when the carrier faces a first direction, the rib pushes the sliding member to push the unlock member, such that a length of the engaging portion protruding from the fixing base is reduced, and the engaging portion is unable to be retained by the first retaining wall;
   wherein, when the carrier faces a second direction different from the first direction, the rib is staggered with the sliding member, such that the engaging portion is able to be retained by the first retaining wall.

2. The transportation device of claim 1, wherein the rail further has at least one second engaging hole, the at least one second engaging hole has a second retaining wall, and a height of the second retaining wall is larger than a height of the first retaining wall; wherein, when the carrier faces the first direction or the second direction, the engaging portion is able to be retained by the second retaining wall.

3. The transportation device of claim 2, wherein the transportation device is configured to be placed on a plane, and a distance between the at least one first engaging hole and the plane is larger than a distance between the at least one second engaging hole and the plane.

4. The transportation device of claim 1, wherein the rail further has at least one inclined surface and the at least one inclined surface extends from the first retaining wall such that the height of the first retaining wall is reduced.

5. The transportation device of claim 1, wherein the first direction is a forward direction of the frame and the second direction is a rearward direction of the frame.

6. The transportation device of claim 1, wherein the sliding member and the unlock member have two inclined surfaces abutting against each other.

7. The transportation device of claim 1, wherein the frame further comprises a first elastic member and the first elastic member abuts against the unlock member and the fixing base.

8. The transportation device of claim 1, wherein the frame further comprises a second elastic member and the second elastic member abuts against the sliding member and the fixing base.

9. The transportation device of claim 8, wherein the sliding member has a slot, the fixing base has a protruding portion, the protruding portion is located in the slot, the second elastic member is disposed in the slot, and the second elastic member abuts against a side wall of the slot and the protruding portion.

10. The transportation device of claim 1, wherein the connecting base has a recess, the connecting base is sleeved on the fixing base through the recess, and the rib is located in the recess.

* * * * *